United States Patent [19]
Raidel

[11] 3,801,086
[45] Apr. 2, 1974

[54] VEHICLE AIR SPRING SUSPENSION ASSEMBLY

[76] Inventor: John E. Raidel, Rt. 9, Box 400-M, Springfield, Mo. 65804

[22] Filed: Aug. 23, 1972

[21] Appl. No.: 283,164

[52] U.S. Cl............................. 267/67, 280/124 F
[51] Int. Cl............................................ B60g 15/00
[58] Field of Search...... 267/31, 66, 67; 280/124 A, 280/124 F

[56] References Cited
UNITED STATES PATENTS

| | | | |
|---|---|---|---|
| 3,694,001 | 9/1972 | McGee | 280/124 F |
| 3,556,554 | 1/1971 | Saward | 280/124 F |
| 3,154,321 | 10/1964 | McLean | 280/124 F |
| 2,941,817 | 6/1960 | Benson | 267/66 |

Primary Examiner—James B. Marbert
Attorney, Agent, or Firm—Rogers, Ezell & Eilers

[57] ABSTRACT

A vehicle air suspension assembly comprising a first beam, means for pivotally mounting the forward end of the first beam to the vehicle chassis, a second beam, means for resiliently connecting the rearward end of the first beam to the rearward end of the second beam, spring means mounted between the rearward end of the second beam and the vehicle chassis, and means for resiliently connecting the forward end of the second beam to the first beam between its ends, whereby the axle load is distributed between the pivotally mounting means, the resiliently connecting means, and the spring means to provide a novel suspension assembly with exceptional comfort and stability.

Inherent in the assembly design is means for allowing for oscillation of the axle as caused by one end of the axle moving up or down relative to the other under various load conditions. Also included are axle mounting means accommodating vehicle axles of various heights and pitches.

21 Claims, 16 Drawing Figures

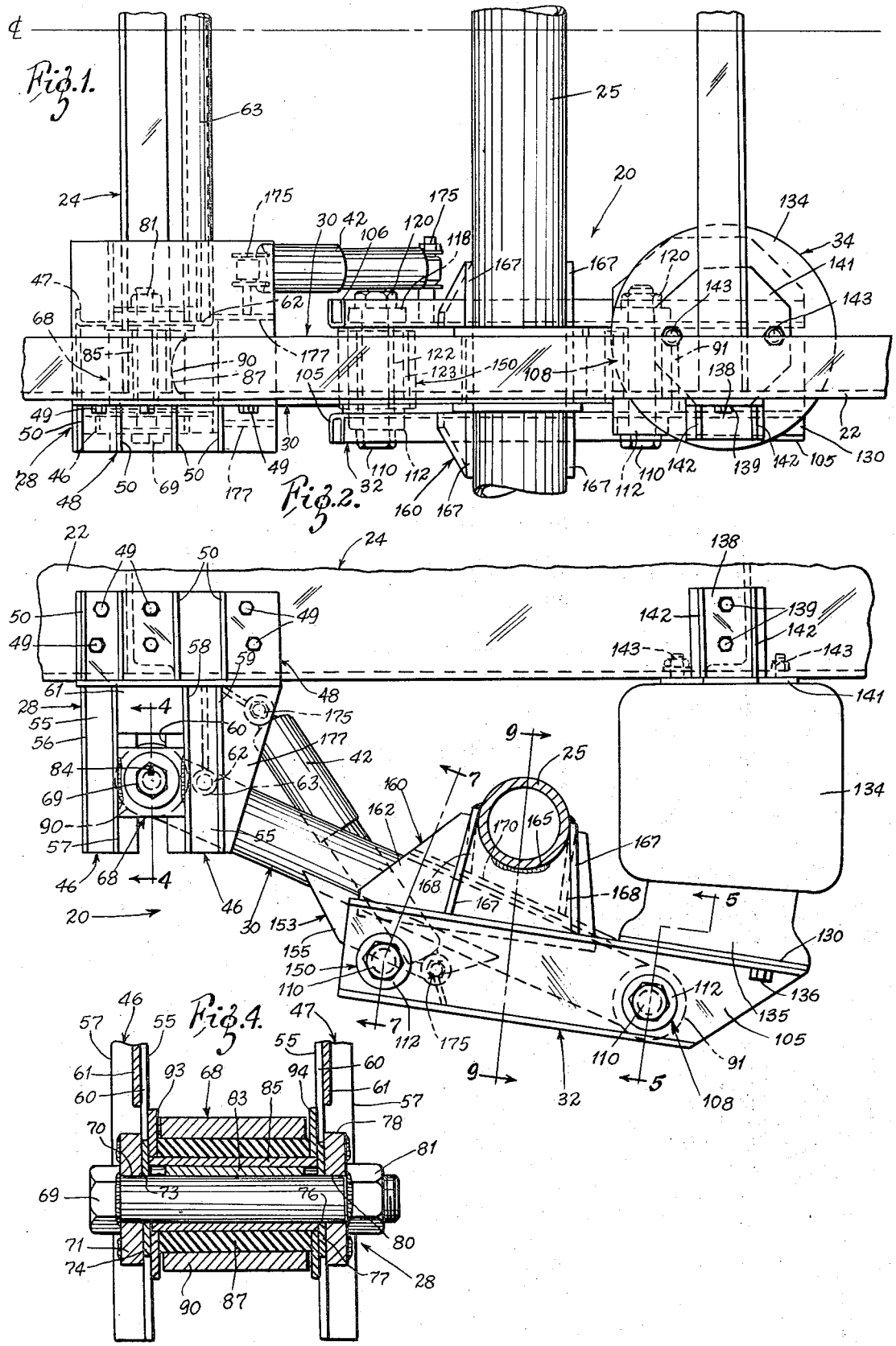

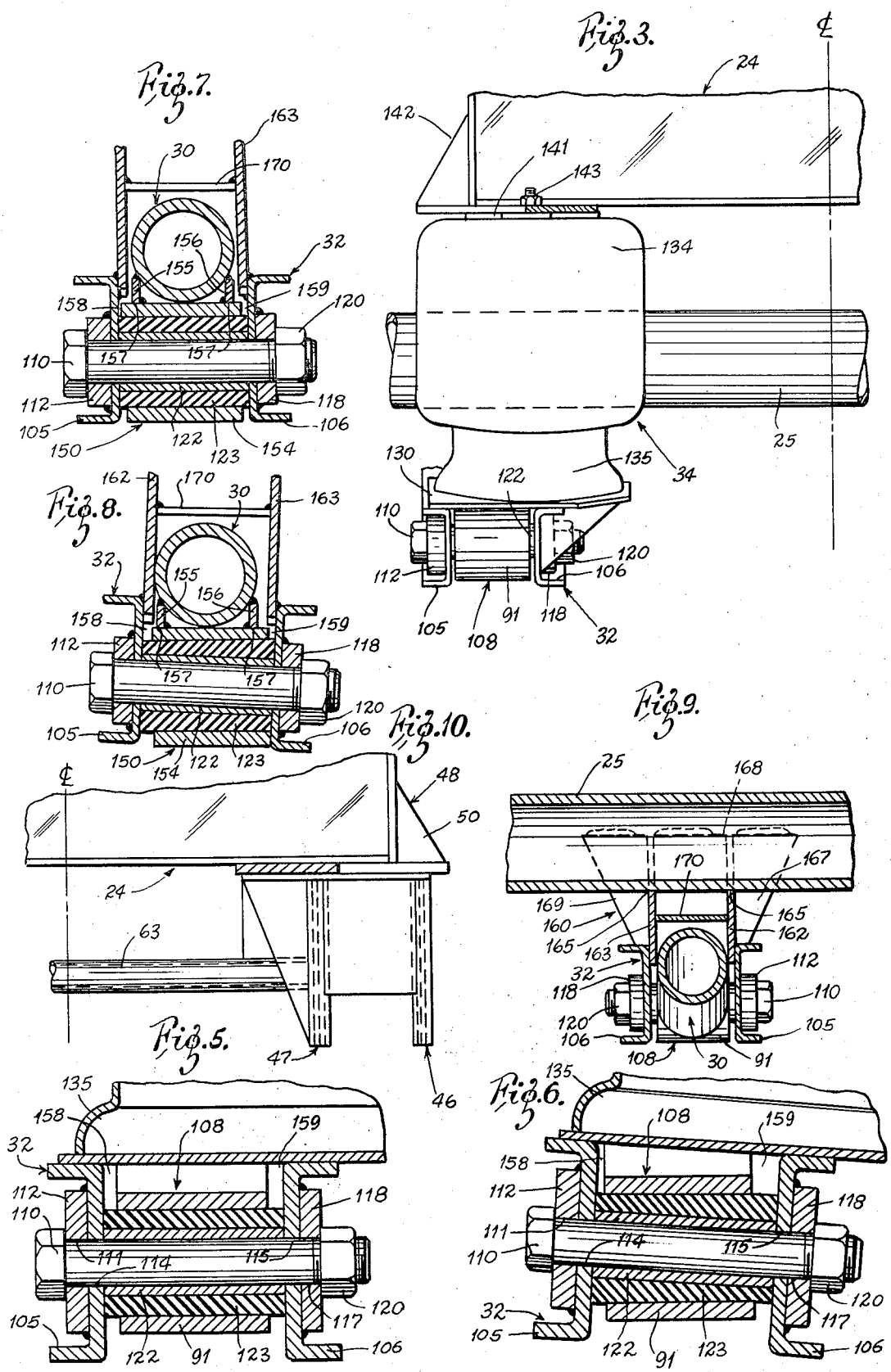

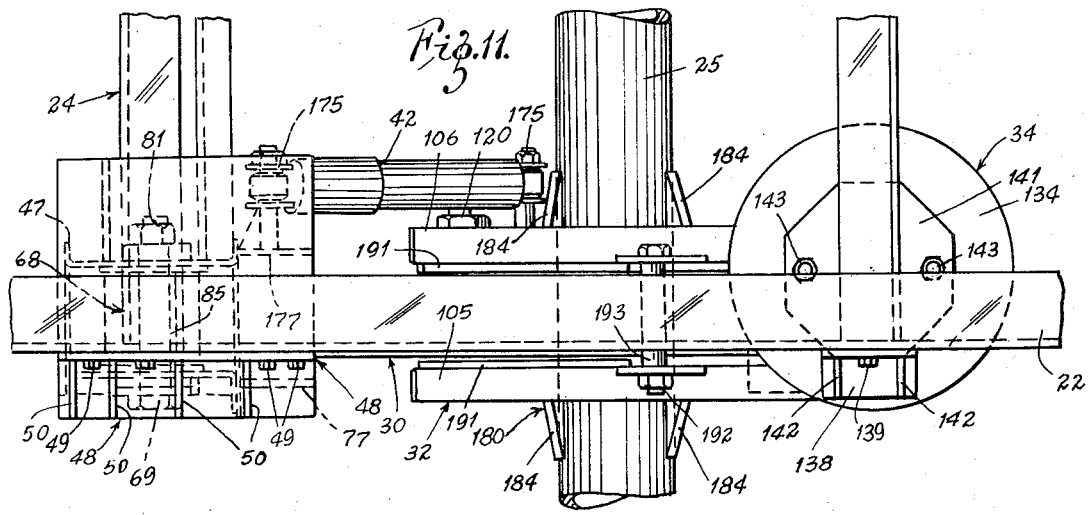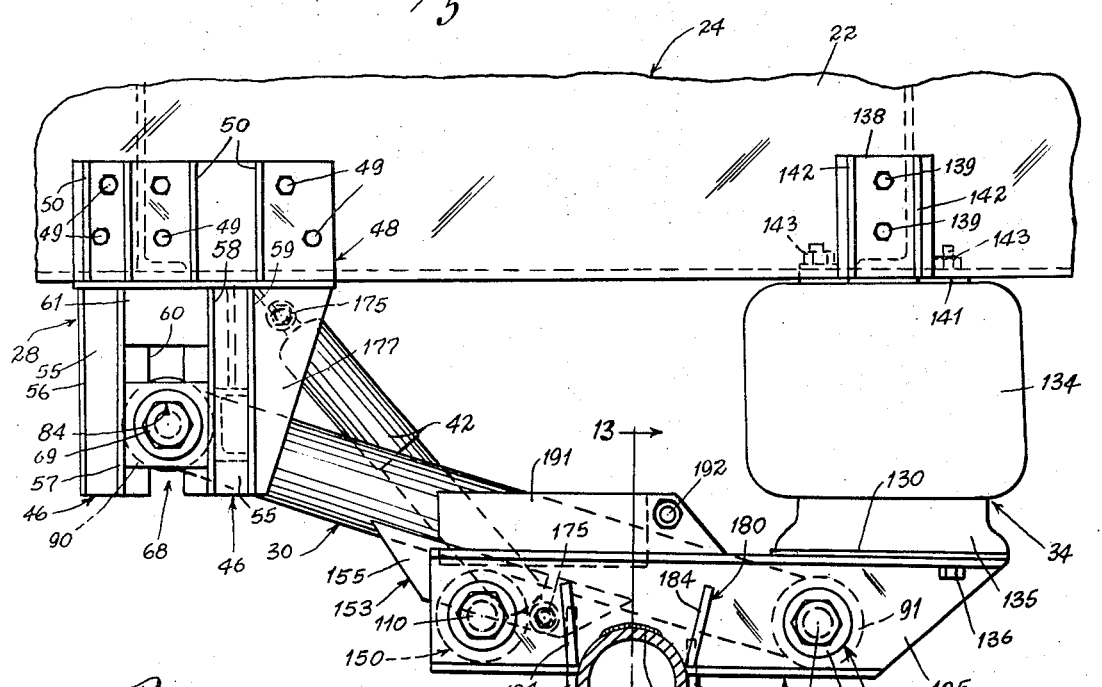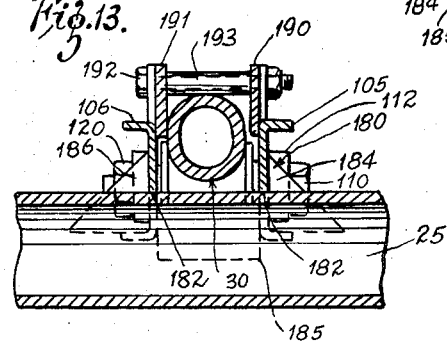

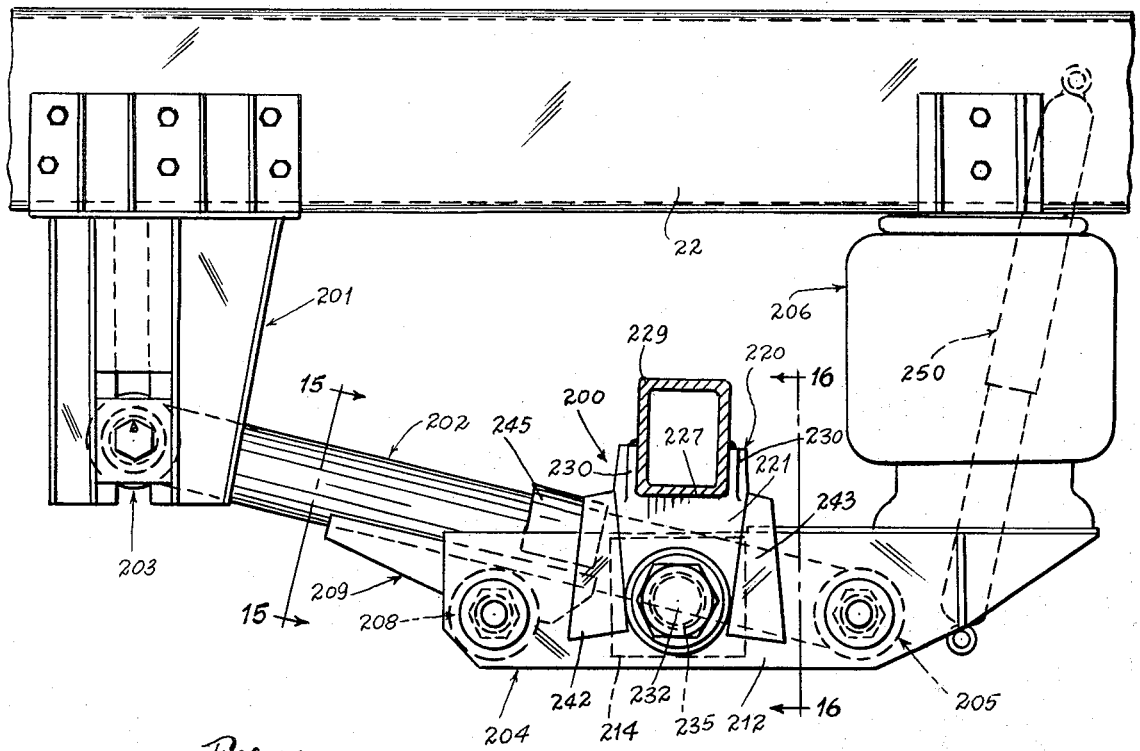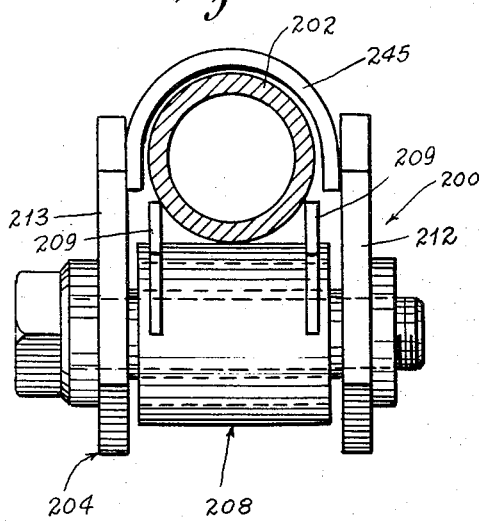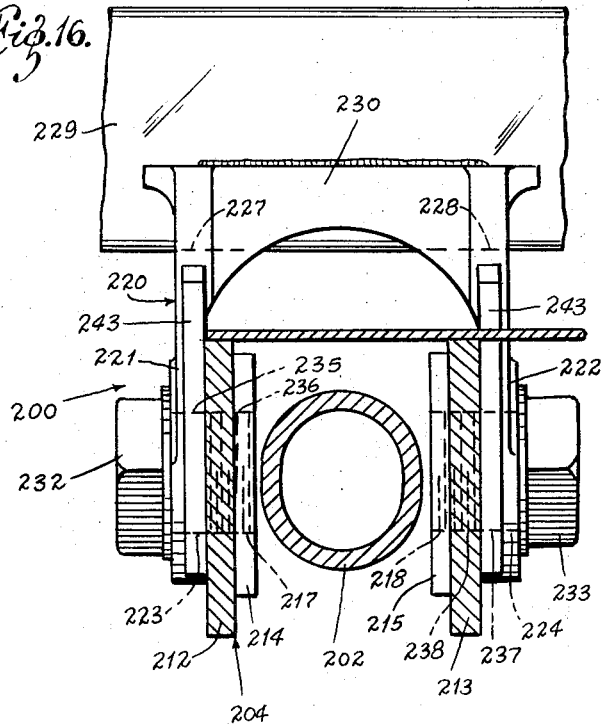

VEHICLE AIR SPRING SUSPENSION ASSEMBLY

SUMMARY OF THE INVENTION

This invention relates to a vehicle suspension assembly, and particularly to an air suspension assembly utilizing a single air spring means in combination with resiliently connected beams, which combination provides an extremely comfortable ride with exceptional stability, and which eliminates the need for leaf springs which fatigue and break, and are difficult to repair.

The suspension assembly of this invention includes a hanger assembly depending from the side of the vehicle chassis. The forward end of a torque means is pivotally mounted about a bushing assembly mounted in the hanger assembly, the torque beam extending rearwardly with its rearward end resiliently connected to the rearward end of a bolster beam. An air spring is mounted between the rearward end of the bolster beam and the vehicle chassis, and the forward end of the bolster beam is resiliently connected to the torque beam between its end. One end of a vehicle axle is mounted by means of an axle mounting bracket to the bolster beam so that the axle moves with the bolster beam which in turn moves against the air spring and the resilient connecting means relative to the vehicle chassis. A shock absorber is mounted between the bolster beam and the vehicle chassis. At the same time the design of this invention permits oscillation of the axle about the longitudinal axis of the torque beam which occurs when one end of the axle moves up or down relative to the other. The axle mounting can be in either the axle overslung or axle underslung position (either under the torque beam or over the torque beam) to accommodate for various axle heights, and in one described embodiment can accommodate axles of various pitches.

THese and other features of the invention will become apparent from the detailed description to follow and the drawings.

DESCRIPTION OF THE DRAWINGS

FIG. 1 is a top plan view of a vehicle suspension assembly of this invention;

FIG. 2 is a side elevation view of the suspension assembly of FIG. 1;

FIG. 3 is a right end elevation view of FIG. 2;

FIG. 4 is an enlarged view in section taken generally along the line 4—4 of FIG. 2; FIG. 5 is an enlarged view in section taken generally along the line 5—5 of FIG. 2;

FIG. 6 is a view similar to FIG. 5 for use in illustrating axle oscillation;

FIG. 7 is an enlarged view in section taken generally along the line 7—7 of FIG. 2;

FIG. 8 is a view similar to FIG. 7 for illustrating axle oscillation;

FIG. 9 is a view in section taken generally along the line 9—9 of FIG. 2;

FIG. 10 is a left end elevation view of the hanger assembly shown in FIG. 2;

FIG. 11 is a top plan view of another embodiment of the invention;

FIG. 12 is a side elevation view of FIG. 11;

FIG. 13 is a view in section taken generally along the line 13—13 of FIG. 12;

FIG. 14 is a side elevation view of another embodiment of the invention;

FIG. 15 is an enlarged view in section taken along the line 15—15 of FIG. 14; and FIG. 16 is an enlarged view in section taken along the line 16—16 of FIG. 14.

A DETAILED DESCRIPTION OF PREFERRED EMBODIMENTS

Referring generally to FIGS. 1 and 2 of the drawing, there is shown an air suspension 20 of this invention mounted to a side member 22 of a vehicle chassis 24. The axle 25 of the vehicle is mounted to the suspension assembly below the chassis 24 in the axle underslung position in a manner to be described.

It is to be understood that the suspension assembly 20 is duplicated on both sides of the chassis with the axle 25, as well as the chassis 24, being similarly connected to both assemblies. It is further to be understood that more than one suspension assembly may be mounted on each side of the chassis such as where multiple axles are used. Because each of the assemblies of this invention is identical, only a single left side assembly will be described, so that in viewing FIG. 2, forward motion of the vehicle is to the left.

The principal components of the suspension assembly 20 comprise a hanger assembly 28 suspended from the side member 22, a torque beam 30 having one end connected to the hanger assembly and its other end connected to one end of a bolster beam 32. Between the same end of the bolster beam 32 and the chassis member 22 is an air spring 34. The other end of the bolster beam 32 is connected in a manner to be described to the torque beam 30. The axle 25 is connected to the bolster beam 32 and a shock absorber 42 is connected between the bolster beam 32 and the hanger assembly 28.

The hanger assembly 28 comprises a pair of extruded hanger rails 46 and 47, the upper ends of which are welded to a hanger bracket 48. THe hanger bracket 48 is fastened by a plurality of bolts 49 to the chassis side member 22 and is suitably reinforced with gusset plates 50.

Each of the hanger rails 46 and 47 is formed with a face plate 55 with vertical webs 56, 57, 58, and 59, and has a central vertical slot 60. A reinforcing plate 61 is welded across the top of each of the rails 46 and 47. One end 62 of a brace member 63 is welded to the face plate 55 between the webs 58 and 59 of the hanger rail 47, with the other end of the brace member 63 welded to the corresponding hanger rail of the right air suspension assembly (not shown) at the opposite side of the vehicle.

A bushing assembly 68 is mounted between the hanger rails 46 and 47. THe bushing assembly 68, as best shown in FIG. 4, comprises a bolt 69 extending through a hole 70 in a plate 71 positioned between the webs 57 and 58 and bearing against the face plate 55 of the rail 46. The shank of the bolt 69 further extends through a hole 73 in a narrower plate 74 which is welded to the inner face of the plate 71 and rides within the slot 60 of the hanger rail 46, and through a hole 76 in another narrow plate 77 that rides within the slot 60 of the hanger rail 47, and which is welded to the inner face of plate 78. The plate 78 is like the plate 71, but is positioned between the webs 57 and 58, and bears against the face plate 55, of the rail 47. The shank of the bolt 69 extends through a hole 80 in the plate 78.

A nut 81 is used to tighten the bushing assembly 68 in place.

The bolt 69 has a cam member 83 which projects to one side and acts as an eccentric. An arrow 84 (FIG. 2) is drawn or stamped on the face of the head of the bolt 69 and points to the central high rise of the cam eccentric 83. A metal sleeve 85 surrounds the shank and cam eccentric 83 of the bolt 69, and a rubber bushing 87 surrounds the sleeve 85. The purpose of the eccentric bolt is to provide means for aligning the axle in the manner described in U.S. Pat. No. 3,510,149. Once the vertical location of the bushing assembly 68 has been selected within the hanger assembly 28, as described in U.S. Pat. No. 3,510,149, the plates 71 and 78 are welded in place.

The torque beam 30 is tubular and terminates at its forward end in a sleeve member 90 and at its rearward end in a sleeve member 91. The sleeve member 90 surrounds the rubber bushing 87 of the bushing assembly 68 for pivotal movement thereabout. Metallic washers 93 and 94 surround the sleeve 85 and are located at opposite ends of the bushing 87 and the sleeve member 90 to provide a relatively tight fit of the sleeve 90 between the hanger rails 46 and 47, thus prohibiting any appreciable movement of the sleeve 90 back and forth between the hanger rails 46 and 47 prohibiting any appreciable rotation of the torque and beam 30 about its longitudinal axes to insure maintenance of proper wheel tracking and alignment as the vehicle rounds corners and the like.

The bolster beam 32 has two parallel generally U-shaped members 105 and 106 spaced an appropriate distance apart so as to allow the rearward portion of the torque beam 30 to move therebetween. Another bushing assembly 108 is located toward the rearward end of the bolster beam 32 between the member 105 and 106 and includes a bolt 110 having a shank extending through a hole 111 in a plate 112 which is welded to the outer surface of the member 105. The shank further extends through a hole 114 in the member 105, a hole 115 in the member 106, and a hole 117 in a plate 118 which is welded to the outer surface of the member 106. A nut 120 is used to tighten the bushing assembly in place. A metallic sleeve 122 surrounds the bolt shank and a rubber bushing 123 surrounds the sleeve 122 between the members 105 and 106.

The rearward sleeve 91 of the torque beam 30 surrounds the rubber bushing 123 of the bushing assembly 108 for resilient movement with respect thereto for purposes to be hereinafter described in more detail.

An air spring mounting plate 130 is welded to the top flanges of the beam 32 at its rearward end. The air spring 34 is of conventional design, having an air spring body 134 above a base 135. The base 135 is mounted such as by bolts 136 to the air spring mounting plate 130. An upper bracket 138 is fastened by bolts 139 to the side member 22 of the vehicle chassis. The bracket 138 includes a horizontal plate 141 and reinforcing gussets 142. The upper side of the air spring body 134 is fastened to the plate 141 by nut and bolt assemblies 143.

As shown in FIG. 2, the bolster beam 32 extends forward about to the midpoint of the torque beam 30. Another bushing assembly 150, identical to the bushing assembly 108, is mounted at the forward end of the bolster beam 32 between the members 105 and 106. Hence, the bushing assembly 150, like the bushing assembly 108, includes a bolt 110, plates 112 and 118 through which the bolt extends, a metallic sleeve 122 surrounding the bolt shank, and a bushing 123 surrounding the metallic sleeve.

A truss assembly 153 connects the bushing assembly 150 to the torque beam 30. The truss assembly 153 comprises a sleeve 154 surrounding the bushing 123, a pair of parallel vertical truss plates 155 and 156 each having a semicircular recess 157 of approximately the same radius as the sleeve 154. The sleeve 154 is secured in the semicircular recesses 157 such as by welding with the plate 155 at one and the plate 156 at the other end of the sleeve. The plates 155 and 156 are welded all along their tops to the torque beam 30. The top of the truss 153 is sufficiently wide to strengthen the torque beam 30 against flexing under heavy load conditions.

Hence, the central portion of the torque beam 30 is connected to the forward end of the bolster beam 32 with resiliency provided by the bushing assembly 150.

One important difference between the bushing assemblies 108 and 150 on the one hand and the bushing assembly 68 on the other is that there are no washers in the bushing assemblies 108 and 150 like the washers 93 and 94 in the bushing assembly 68, leaving spaces 158 and 159 between the ends of the sleeves 91 and 154 and the members 105 and 106. This, as will be more fully explained, permits oscillation of the axle about the longitudinal axes of the torque beam as where one end of the axle moves up or down under load relative to its other end.

The axle 25 is mounted to the bolster beam 32 by means of an axle mounting bracket 160, which in the axle underslung position shown in FIG. 2, straddles and supports the axle above the torque beam 30. The axle bracket 160 includes a pair of parallel vertical plates 162 and 163 welded to the inside surfaces of, and extending upwardly from, the members 105 and 106, respectively, of the bolster beam 32. Each of the plates 162 and 163 has a semicircular shaped recess 165 of approximately the same radius as the axle 25. The axle 25 is secured in the semicircular shaped recess 165 such as by welding. To add side rigidity to the axle mount 160, on each side of the axle there are reinforcing plates 167, 168, and 169 which are shaped generally as shown in FIG. 9. The plates 167 and 169 are mounted outside the plates 162 and 163 and are secured at their lower ends to the plates 162 and 163 and the tops of the members 105 and 106 of the bolster beam 32, and at their tops to the axle such as by welding. The middle plate 168 extends only a short distance below the bottom of the axle 25 so as not to impede movement of the torque beam 30 within the bolster beam 32 and the axle bracket 160 permitted by the resilient bushings 108 and 150. Hence, the axle bracket 160 provides a very rigid and secure support for the axle on the bolster beam 32 while permitting some movement of the torque beam therein. Another reinforcing plate 170 is mounted between the vertical plates 162 and 163 between the axle 25 and torque beam 30 to add further support to the axle mount.

As best seen in FIGS. 1 and 2, the shock absorber 42, of a type commonly known in the art, is connected by nut and bolt assemblies 175 between the hanger assembly 28 and the bolster beam 32, with the top of the shock absorber 42 connected to a flange extension 177 of the hanger assembly 28 and its bottom end connected to the plate 156 of the truss 153.

FIGS. 11, 12, and 13 show another embodiment of the invention with the axle 25 mounted in the axle overslung position (with the axle mounted beneath the torque beam 30). Otherwise, the two embodiments are the same. Hence, this second described embodiment, like the first, includes the hanger assembly 28, the torque beam 30 with its forward end pivotally connected to the hanger assembly 28 by the bushing assembly 68, the bolster beam 32 with its rearward end connected to the rearward end of the torque beam 30 by means of the bushing assembly 108, the air spring 34 connected between the rearward end of the bolster beam 32 and the vehicle chassis member 22, and the bushing assembly 150 and truss 153 connecting the middle portion of the torque beam 30 to the forward end of the bolster beam 32. Although the axle mounting bracket in this described embodiment is basically the same as the bracket 160 of the first described embodiment, there are some differences.

Hence, there is shown an axle mounting bracket 180 for mounting the axle under the torque beam 30. Each of the members 105 and 106 of the bolster beam 32 has a semicircular shaped recess 182 of approximately the same radius as the axle 25. The axle 25 is secured in the semicircular shaped recesses 182 such as by welding. To add side rigidity to the axle mount 180, on each side of the axle there are reinforcing plates 184, 185, and 186 which are shaped generally as shown in FIG. 13. The plates 184 and 186 are generally triangular in shape with each having a side secured to the outsides of the members 105 and 106 and an adjacent bottom side secured to the axle such as by welding. The middle plate 185 is welded between the members 105 and 106 with its bottom edge welded to the axle 25 with sufficient clearance between the torque beam 30 and the plates 185 to allow some movement of the torque beam 30 relative to the axle 25 as permitted by the resiliency of the bushings 108 and 150.

Another pair of parallel plates 190 and 191 extend vertically upward from the tops of the members 105 and 106, respectively, of the bolster beam 32 with their bottoms suitably secured to the tops of the members 105 and 106. A nut and bolt assembly 192 extends through the plates 190 and 191 just above the torque beam 30 and generally above the axle 25. Surrounding the shank of the bolt between the plates 190 and 191 is a bearing sleeve 193. The purpose of the bearing sleeve 193 is to prevent any tendency for the axle 25 to rotate when the brakes are applied with the vehicle moving forward. Although the bushing assembly 150 and truss 153 will prevent any appreciable tendency for the axle 25 to rotate, the resiliency of the bushing 150 does permit a slight rotation which may be further reduced by use of the bearing sleeve 193.

FIGS. 14, 15, and 16 shows another embodiment of the invention incorporating a special axle mounting bracket 200 that accommodates axles of various pitches. Otherwise, this embodiment is much the same as those first described. Hence, this embodiment also includes a hanger assembly 201 much like the hanger assembly 28, a torque beam 202 much like the torque beam 30 with its forward end pivotally connected to the hanger assembly 201 by a bushing assembly 203 like the bushing assembly 68. Also included is a bolster beam 204 very similar to the bolster beam 32 with its rearward end connected to the rearward end of the torque beam 202 by means of a bushing assembly 205 like the bushing assembly 108. An air spring 206, like the air spring 34, is connected between the rear end of the bolster beam 204 and the vehicle chassis member 22, and there is a bushing assembly 208 and truss 209, similar to the bushing assembly 150 and truss 153, connecting the middle portion of the torque beam 202 to the forward end of the bolster beam 204. All of these components are basically the same as the corresponding components of the first two described embodiments and cooperate as assembled in substantially the same manner. The basic difference lies in the axle mounting bracket 200.

The bolster beam 204 of this described embodiment is comprised of two parallel rails 212 and 213 having inside reinforcing plates 214 and 215, respectively. An internally threaded hole 217 extends through the rail 212 and plate 214, and an internally threaded hole 218 extends through the rail 213 and plate 215, which holes 217 and 218 are axially aligned. A straddle bracket 220 has leg members 221 and 222 that straddle the bolster beam 204 such that the leg 221 extends downwardly over the outer surface of the bolster rail 212 and the leg 222 extends downwardly over the outer surface of the bolster rail 213. The legs 221 and 222 have nonthreaded holes 223 and 224, respectively, that are axially aligned with the holes 217 and 218. The tops of the legs 221 and 222 of the straddle bracket 220 have U-shaped recesses 227 and 228 for receiving the vehicle axle 229. A suitable reinforcing plate 230 is mounted between the legs 221 and 222 of the straddle bracket at each side and near the top. The axle 229 is preferably welded to the straddle bracket 220 all around the U-shaped slots and along the top of the reinforcing plates 230.

The straddle bracket 220 is secured to the bolster beam 204 by means of anchor bolts 232 and 233. The anchor bolt 232 has a nonthreaded shank portion 235 that extends through the hole 223 and a threaded shank portion 235 that extends through the hole 217. Likewise, the anchor bolt 233 has a nonthreaded shank portion 237 that extends through the hole 224 and a threaded shank portion 238 that extends through the hole 218. Hence, tightening the bolts 232 and 233 tightens the legs 221 and 222 of the angle bracket 220 against the bolster rails 212 and 213.

As will be described, the purpose of the bolts 232 and 233 is to allow the axle mounting bracket to pivot when the bolts are loosened to a selected pitch position. Once the position is selected, the bolts are tightened. However, the bolts alone are not sufficient to hold the axle firmly in the selected position against the great forces acting on the axle due to variations in load and road conditions. For this reason lock plates 242 and 243 are mounted such as be welding at each side of the straddle bracket leg 221 and leg 222, these lock plates being attached both to the straddle bracket 220 and the torque beam 204 to firmly lock the straddle bracket in the selected pitch position.

A semicircular shaped torque beam stop 245 extends over the top of the torque beam 202 as best shown in FIG. 15 with its opposite sides attached to the inside surface of the bolster rails 212 and 213. The stop 245 performs generally the same function as the bearing sleeve 193 of the previously described embodiment.

A shock absorber 250 is mounted between the chassis 22 and the bolster beam 204 as shown in FIG. 14 and performs the same function as the shock absorber 42 of the previously described embodiments.

OPERATION

The functions of the suspension assemblies 20 are to resiliently support varying total loads carried by the vehicle body on the vehicle chassis 24, and to provide an extremely comfortable yet exceptionally stable suspension without the use of leaf springs which fatigue and break, and which are difficult to repair.

The load is distributed between the bushing assemblies 68, 108, and 150 and the air spring 34. As a load is applied to the axle 25, the tendency for the chassis 24 to move downwardly relative to the axle 25 is resisted in part by the air spring 34. This load that tends to move the axle 25 upwardly relative to the chassis also tends to move the bolster beam 32, and hence the bushing assembly 150 including the rubber bushing 123, upwardly as well. However, this upward movement is resisted by the torque beam 30 which is secured at its middle portion to the bushing assembly 150 by means of the truss 153 and sleeve 154, and which torque beam 30 is secured at its forward end to the hanger assembly 28 by means of the bushing assembly 68 and at its rearward end to the rearward end of the bolster beam 32 by means of the bushing assembly 108. The result is a tendency for the bolster beam 32 to rotate in a clockwise direction as viewed in FIG. 2 about the bushing assembly 108, which tends to move the forward end of the bolster beam 32 and the entire torque beam 30 upwardly against the resilient bushing assemblies 68, 108, and 150. Hence, the various bushing assemblies 68, 108, and 150, the air spring 34, and the torque and bolster beams combine in a unique manner to provide exceptional comfort and stability under varying load conditions. The unique design also provides for mounting the axle in either the "overslung" or "underslung" position.

It is another primary feature of this invention that, while it incorporates rigid beams 30 and 32, it nevertheless permits oscillating movement of the axle 25 relative to the vehicle chassis as occurs when one end of the axle moves up or down relative to its other end, and yet prevents transverse, forward, and rearward movement of the axle 25 relative to the chassis. As previously stated, the bushing assembly 68 has end washers 93 and 94 to prevent the forward end of the torque beam 30 from moving transversely between the hanger rails 46 and 47. THese same washers 93 and 94 also prevent rotation of the torque beams 30 about its longitudinal axes. However, the bushing assemblies 108 and 150 do not have washers such as the washers 93 and 94, thus leaving the spaces 158 and 159. This permits some oscillating movement of the bushing assembly 108 within the sleeve end 91 and of the bushing assembly 150 within the sleeve 154, and hence the axle 25 about the longitudinal axis of the torque beam 30, due to the inherent flexibility of the rubber bushings 123. For example, if the left end of the axle 25 moves upward with respect to its right end and the chassis 22, the axle 25, its support 160 and 180, the bolster beam 32, and the bushing assemblies 108 and 150 take the position generally shown in FIGS. 6 and 8, respectively, it being remembered that the sleeve end 91 of the torque beam 30, and the sleeve 154 of the truss 153 remain generally fixed since the torque beam 30 is prevented from rotating by the washers 93 and 94 in the bushing assembly 68.

Although the reference numerals used thus far in describing the operation of the invention relate to the first two described embodiments, it is to be understood that the corresponding components of the third described embodiment are basically the same as those of the first two and operate in generally the same manner except for the operation of the mounting bracket now to be described.

The axle mounting bracket of the last described embodiment represents another important feature of this invention in that it provides a means for accommodating vehicle axles of various pitches. This is accomplished by loosening the anchor bolts 232 and 233 to allow the straddle bracket 220 to pivot about the axes of the bolts. With the straddle bracket 220 free to pivot and the bushing assembly 203 loose so that it is free to move vertically within the hanger 201 as well as adjust fore and aft by means of the eccentric bolt, the straddle bracket can be positioned with the axle 229 mounted within the slots 227 and 228. The fore and aft position is, of course, also determined by proper location of the mounting brackets 48 and 138. With the bracket 220 as positioned, the bolts 232 and 233 are tightened to hold it in place while the axle is welded to the bracket. Then to insure that the pitch position of the bracket 220 remains unchanged, the lock plates 242 and 243 are welded to the bracket 220 and bolster beam 204. The bushing assembly 203 is also secured in its selected position.

As an alternative, the straddle bracket 220 can be first welded to the axle 229 and then bolted and welded to the bolster beam 204, or if the axle pitch is previously known the straddle bracket 220 can be premounted by means of the lock plates 242 and 243 to the bolster beam 204 in the proper pitch position making later adjustments during the mounting of the suspension assembly to the vehicle unnecessary.

Hence, there has been described a unique air suspension assembly providing exceptional comfort and stability with a single air spring and without the use of leaf springs, which can accommodate various axle heights with mounting in either the overslung or underslung positions, which permits oscillating movement of the axle relative to the vehicle chassis, and which in one described embodiment provides an adjustable axle mounting bracket to accommodate various axle pitches.

Various changes and modifications may be made in this invention, as will be readily apparent to those skilled in the art. Such changes and modifications are within the scope and teaching of this invention as defined by the claims appended hereto.

What is claimed is:

1. A vehicle suspension assembly comprising a first beam, means for pivotally mounting the forward end of the first beam to the vehicle chassis, a second beam, means for connecting the rearward end of the first beam to the second beam, spring means between the rearward end of the second beam and the vehicle chassis, means connecting the forward end of the second beam to the first beam between its ends, and means for mounting the vehicle axle to the second beam.

2. The suspension assembly of claim 1 wherein the spring means is an air spring.

3. The suspension assembly of claim 1 wherein the rearward end of the first beam is resiliently connected to the second beam, and the forward end of the second beam is resiliently connected to the first beam.

4. The suspension assembly of claim 3 wherein the rearward end of the first beam is connected near the rearward end of the second beam, and the vehicle axle is mounted between the connecting means.

5. The suspension assembly of claim 1 including a hanger assembly depending from the vehicle chassis, and means for pivotally mounting the forward end of the first beam to the hanger assembly.

6. The suspension assembly of claim 1 wherein the pivotally mounting means includes a bushing assembly having resilient bushing means therein.

7. The suspension assembly of claim 1 including oscillation dampening means connected between the second beam and the vehicle chassis.

8. The vehicle suspension assembly of claim 1 including a stop means associated with axle movement and which bears downwardly on the first beam to prevent rotation of the axle when the brakes are applied.

9. The vehicle suspension assembly of claim 3 including means permitting oscillation of the vehicle axle relative to the chassis as occurs where one end of the axle moves up or down relative to its other end.

10. The vehicle suspension assembly of claim 9 wherein only the resilient connecting means for mounting the rearward end of the first beam to the second beam and the resilient connecting means for connecting the forward end of the second beam to the first beam permit said oscillation.

11. The vehicle suspension assembly of claim 10 wherein the resilient connecting means are permitted limited rotation about the longitudinal axis of the first beam to accommodate for axle oscillation.

12. The vehicle suspension assembly of claim 1 wherein the axle is mounted over the first beam.

13. The vehicle suspension assembly of claim 1 wherein the axle is mounted below the first beam.

14. A vehicle suspension assembly comprising a first beam, a first bushing means for pivotally mounting the forward end of the first beam to the vehicle chassis, a second beam, a second bushing means for resiliently connecting the rearward end of the first beam near the rearward end of the second beam, spring means between the rearward end of the second beam and the vehicle chassis, a third bushing means for resiliently connecting the forward end of the second beam to the first beam between its ends, and means for mounting the vehicle axle to the second beam.

15. The vehicle suspension assembly of claim 14 wherein the axle is mounted between the connections of the first beam to the second beam.

16. The vehicle suspension assembly of claim 14 wherein the means for resiliently connecting the forward end of the second beam to the first beam comprises a bushing means having a resilient sleeve associated therewith, a rigid sleeve member surrounding the resilient sleeve, and a truss means connecting the rigid sleeve to the first beam.

17. The suspension assembly of claim 16 wherein the truss means is sufficiently wide to act as a reinforcing means against flexing of the first beam under load.

18. The vehicle suspension assembly of claim 14 wherein the first beam extends over the top of the forward resilient connecting means between the first and second beams.

19. A vehicle suspension assembly for supporting a vehicle chassis on a vehicle axle comprising an axle mounting bracket to which the vehicle axle is secured, a bolster beam, means for pivotally mounting the axle bracket to the bolster beam, spring means for resiliently supporting the vehicle chassis on the bolster beam, a torque beam, means associated with the chassis for pivotally supporting one end of the torque beam from the vehicle chassis, means associated with the bolster beam for supporting the other end of the torque beam from the bolster beam, and means for securing the axle bracket to the torque beam at a selected pivotal position, whereby the axle bracket can be pivoted relative to the bolster beam to adjust to the pitch of the vehicle axle, and then secured in that selected position.

20. THe vehicle suspension assembly of claim 19 wherein the securing means further comprises lock plates securely mounted to the axle bracket and bolster beam to hold the axle bracket in fixed position relative to the bolster beam.

21. The vehicle suspension assembly of claim 19 wherein the axle bracket further comprises a pair of vertical legs which straddle the bolster beam, and the pivotally mounting means further comprises axially aligned anchor bolts extending through the legs and bolster beam.

* * * * *